Feb. 7, 1933.   N. LITTELL ET AL   1,896,319
PIN TUMBLER LOCK
Filed Aug. 18, 1928   4 Sheets-Sheet 1

INVENTORS
Nelson Littell, and
William P. Hammond,
By Hammond & Littell
ATTORNEYS

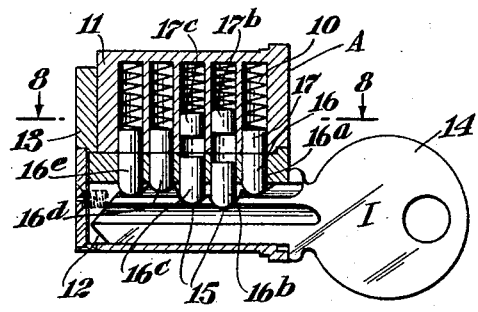
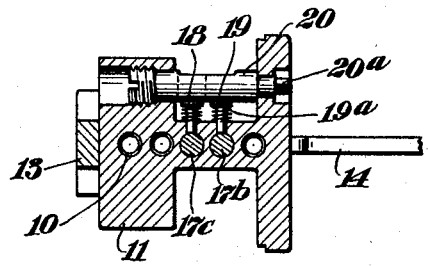
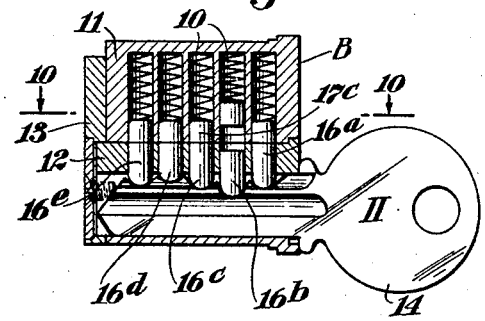
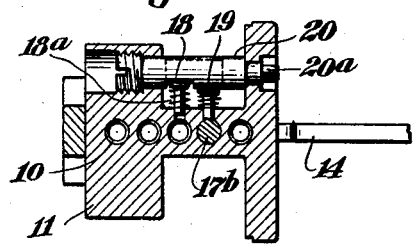
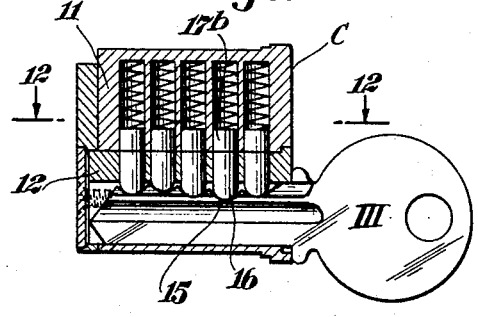
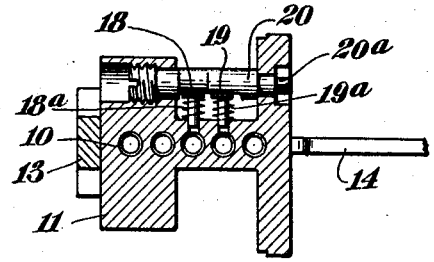

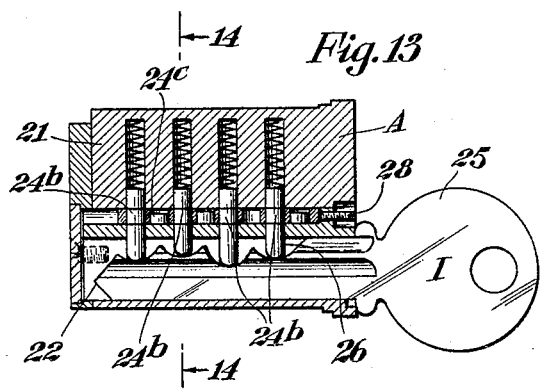
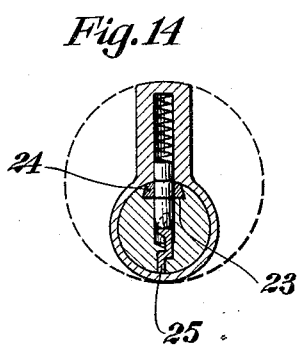
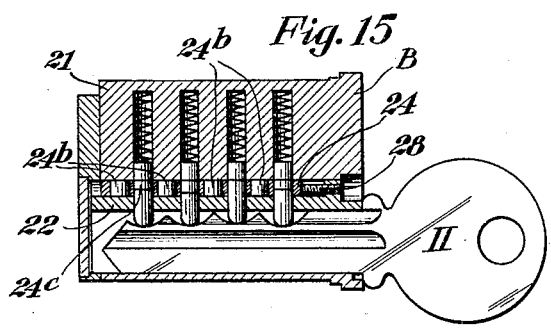
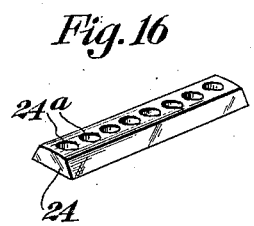
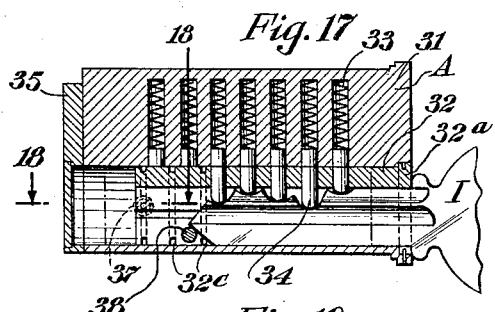
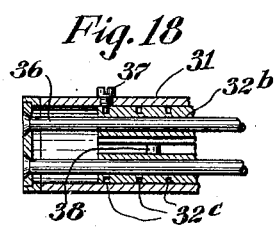
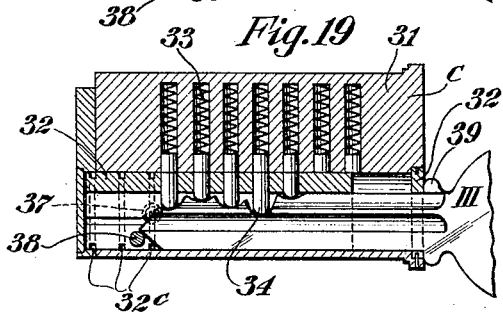
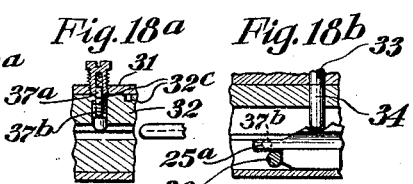
INVENTORS
Nelson Littell, and
William P. Hammond,
By
ATTORNEYS Feb. 7, 1933. N. LITTELL ET AL 1,896,319
PIN TUMBLER LOCK
Filed Aug. 18, 1928  4 Sheets-Sheet 4
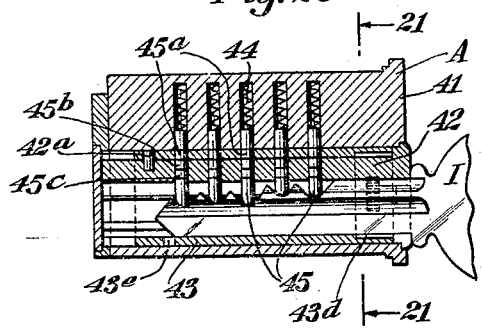
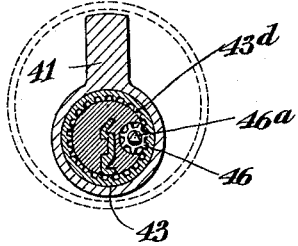
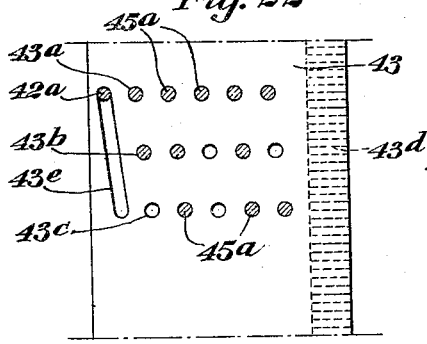
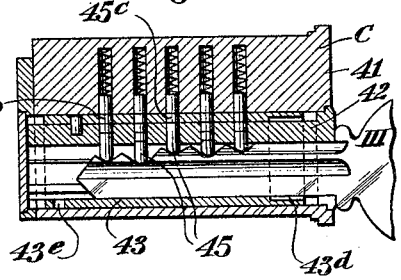
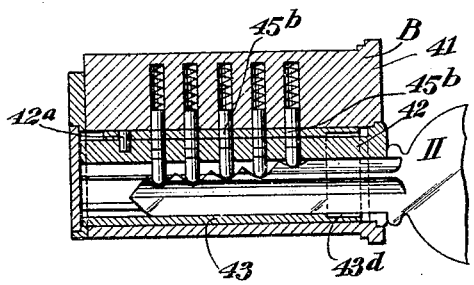
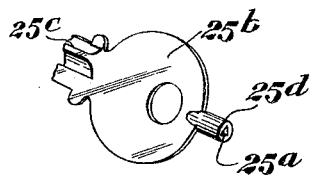
INVENTORS
Nelson Littell, and
William P. Hammond,
By Hammond & Littell
ATTORNEYS Patented Feb. 7, 1933

1,896,319

UNITED STATES PATENT OFFICE

NELSON LITTELL, OF NEW CANAAN, CONNECTICUT, AND WILLIAM P. HAMMOND, OF SCARSDALE, NEW YORK

PIN TUMBLER LOCK

Application filed August 18, 1928. Serial No. 300,480.

This invention relates to an improvement in pin tumbler locks.

In the use of locks of this type, it very often happens that when one key to a particular lock is lost, it becomes necessary either to take off and discard the lock mechanism and replace it with a new lock, or to have the combination of the lock changed, as the lock is no longer a safe lock if there is one key unaccounted for with the possibility that this key may fall into the hands of an unscrupulous person who will use the same to effect entry to the door guarded by that particular lock. Whether the lock mechanism is discarded and replaced with a new lock mechanism, or whether the locksmith is called in to change the combination, a substantial expense is involved in this change.

It is the object of this invention to provide a pin tumbler lock in which the combination can be quickly changed by the ordinary householders or laymen without removing the lock from its housing and without the service of a locksmith and without discarding the lock mechanism.

Another object of the invention is to provide a method of extending the effective life of a lock in which each lock will be provided with a plurality of sets of keys and with arrangements whereby the ordinary householders or laymen can change the lock mechanism or combination to correspond with the various sets of keys and as keys in one set are lost, change the combination to make it impossible to operate the lock by that set of keys and make use of another set of keys to prolong the useful life of the lock.

Another object of the invention is to provide a lock which will have several times the effective length of life of the ordinary lock now in use without servicing or upkeep costs and at the same time afford normal security against entry by persons who may come into unauthorized possession of keys thereto.

Various other objects and advantages of this invention will appear as the description proceeds.

In the accompanying drawings which illustrate various possible forms of embodiment of our invention:

Figure 7 is a sectional view of another form of embodiment of our invention with the lock combination in the A position;

Figure 8 is a sectional view on the line 8—8 of Figure 7;

Figure 9 is a view similar to Figure 7 with the lock combination in the B position;

Figure 10 is a sectional view on the line 10—10 of Figure 9;

Figure 11 is a sectional view of the lock mechanism in the C position;

Figure 12 is a sectional view on the line 12—12 of Figure 11;

Figure 13 is a sectional view of a further form of embodiment of the invention with the lock mechanism in the A position;

Figure 14 is a sectional view on the line 14—14 of Figure 13;

Figure 15 is a view similar to Figure 13 with the lock mechanism in the B position;

Figure 16 is a perspective detail;

Figure 17 is a sectional view of a further modified form of embodiment of the invention in the A position;

Figure 18 is a detail view on the line 18—18 of Fig. 17;

Fig. 18ª is a modified detail of construction in sectional plan view.

Fig. 18ᵇ is a side sectional view of the modification of Fig. 18ª.

Fig. 19 is a sectional view similar to Fig. 17 in the C position of the lock mechanism;

Fig. 20 is a sectional view of a further modified form of embodiment of the invention showing the mechanism in the A position;

Fig. 21 is a sectional view on the line 21—21 of Fig. 20;

Fig. 22 is a development or plan view of the movable cylinder surrounding the key barrel;

Fig. 23 is a sectional view similar to Fig. 20 showing the mechanism in the B position;

Fig. 24 is a sectional view similar to Fig. 20 showing the lock mechanism in the C position;

Fig. 25 is a detail perspective view of a modification of a lock key.

Figure 1:
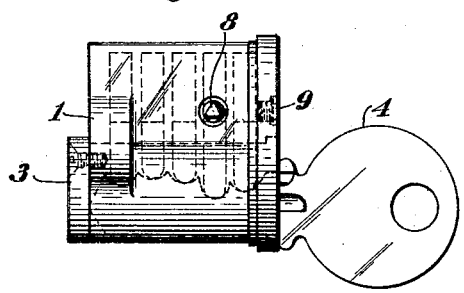
Figure 1 is a sectional view of a pin tumbler lock constructed according to one form of embodiment of our invention.
Figure 2:
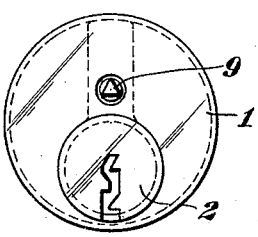
Figure 2 is a front view of the lock shown in Figure 1.

In the form of the embodiment of the invention illustrated in Figure 1, an ordinary five plunger pin tumbler lock is shown comprising a housing 1 housing the key barrel 2 to which the cam 3, for unlatching the door, is secured, and which is adapted to receive the usual zigzag bitted key 4 provided with bights 5 for moving the meeting line of the tumblers 6 and the plungers 7 to the parting line between the housing 1 and the barrel 2 of the lock. In addition to these usual parts of a pin tumbler lock, the embodiment of Figure 1 is provided with retainers 8 and 9 which are preferably screw plugs provided with triangular heads for controlling the operation of two of the lock plungers in a manner to be described.

Figure 3:
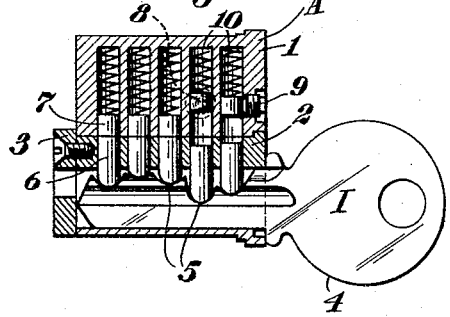
Figure 3 is a sectional view of this lock in the A position of operation using No. I key.
Figure 4:
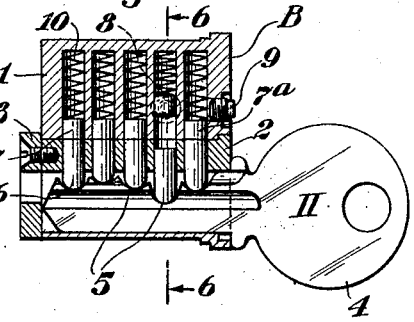
Figure 4 is a view similar to Figure 3 showing the lock combination changed for use with the No. II key.
Figure 5:
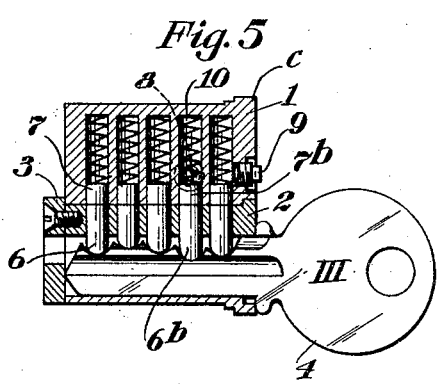
Figure 5 is a view similar to Figure 3 showing the lock combination changed for use with the No. III key.
Figure 6:
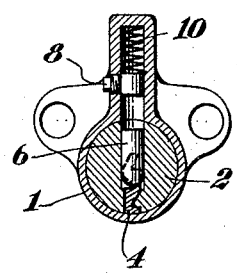
Figure 6 is a sectional view on the line 6—6 of Figure 4.

As illustrated in Figure 3, the last three bights of the No. I key are arranged to bring the last three tumblers 6 to the line of separation between the barrel 2 and the housing 1. The first two bights of the No. I key permit the first two tumblers of the lock to fall below the separation line while the first two plungers are held in inoperative position against the pressure of the springs 10 by the retainers 8 and 9 so as to permit unlocking of the lock by the No. I key. In case one of the No. 1 keys of the set should become lost or misplaced, or in the event of any other condition making it desirable to change the combination of the lock so as to render the No. I lock inoperative for unlocking the lock, the retainer 9 may be unscrewed to release the plunger 7a in which event this plunger will be projected across the parting line of the barrel 2 and the housing 1 to prevent unlocking of the lock by the No. I key and the No. II key which is sold with the lock and which is provided with a bight which brings the bottom of plunger 7a to the parting line of the lock may then be used for unlocking the lock. Similarly, when the No. II key becomes lost or misplaced, or when it becomes necessary to change the lock combination for any other reason, the retainer 8 may be retracted to permit the plunger 7b to be pushed downward by the spring 10 so that with either the No. I or the No. II key in the barrel 2, the plunger 7b will be projected across the parting line of the barrel 2 and the housing 1 to prevent operation of the lock by the No. I or No. II keys, whereas the No. III key, which is sold with the lock, is provided with a bight which will bring the top of the plunger 6b to the parting line of the barrel 2 and the housing 1 to permit unlocking of the lock by the No. III key. In this manner there is provided a means for progressively changing the lock combination for use with the No. I, No. II and No. III keys, all of which will preferably be sold with the particular lock, so that the lock combination may be twice changed and the No. I or No. II keys, if they should become lost, rendered ineffective to operate the lock, and the life of the lock, without the service of a locksmith, is prolonged about three times its present normal life by merely retracting the retainers 8 and 9 at the desired times. This operation can be easily carried out by the ordinary layman or householder without the service of an expert locksmith.

The plunger 9 is made accessible at the front of the lock so that removal of the lock from its housing is not necessary to change from the No. I or A combination to the No. II or B combination, and to change from the No. II or B combination to the No. III or C combination, it is only necessary to remove the housing from the door and release the retainer 8. It is to be understood, of course, that, if desired, more than five plungers and tumblers may be used to give the necessary variations in lock combinations for large installations.

In the form of embodiment of the invention illustrated in Figures 7 to 12, inclusive, the housing is indicated at 11, the key barrel at 12, the unlatching cam at 13, the key at 14, the bights of the key at 15, the tumblers at 16 and the plungers at 17. In this embodiment of the invention, retaining means 18 and 19 are provided for controlling the operation of the plungers 17b and 17c and a cam shaft 20 controlled by a triangular projection 20a accessible from the front of the lock is used to determine the position of the retaining means 18 and 19. In this embodiment of the invention with the No. I key in position, the bights 15 are designed to hold the top of the tumblers 16a, 16d and 16e at the parting line between the barrel 12 and the housing 11 and to drop the tumblers 16b and 16c below the parting line to permit operation of the lock by the No. I key. In changing the lock to the No. II or B combination, the cam shaft 20 is rotated from the position indicated in Figure 8 to the position in Figure 10 to permit the retainer 18 to be retracted under the influence of the spring 18a to permit tumbler 17c to be forced downwardly by the spring 10, so that if the No. I key is in position, the plunger 17c will be projected across the parting line of the barrel 12 and the housing 11, and will prevent the operation of the lock by the No. I key, but the No. II key provided with a bight which raises the top of the tumbler 16c to the parting line of the barrel 12 and the housing 11 is operative to unlock the lock. To further change the combination, the cam shaft 20 is rotated to the position shown in Figure 12 permitting the retainer 19 to be retracted by the spring 19a to project the plunger 17b across the parting line of the barrel 12 and housing 11 if either the No. I or No. II key is inserted in the lock thereby preventing operation of the lock by the No. I or No. II keys, but permitting the operation of the lock by the No. III key which is provided with bights 15 raising the top of all of the plungers 16 to the parting line of the barrel and the housing.

In the form of embodiment of the invention illustrated in Figures 13 to 16, the key barrel 22 located in the housing 21 is provided with a dove-tailed slot 23 in which a slide 24 provided with a plurality of holes 24a therethrough is slidably mounted. In the A position of the lock, the holes 24a in the slide 24 are provided with pellets or discs 24b of the same length as the thickness of the slide 24 so that when the keys 25 provided with bights of the right depth are inserted in the barrel 22, the plungers 26 and the discs 24b are elevated to elevate the top of the discs 24b to the parting line between the barrel 22 and the housing 21 to permit operation of the lock and if the No. II key should be inserted in the lock while the slide 24 is in the No. I position, the tumblers 26 and the discs 24b will be moved upwardly beyond the parting line to prevent operation of the lock by the No. II key. To change the lock mechanism from the A to the B combination, the slide 24 is shifted rearwardly by means of the screw 28, the No. I key being in the lock at this time, to the position shown in Figure 15, in which the holes 24a, having either no discs or having discs 24b which are of nonuniform thickness and are shorter than the thickness of the slide 24, are located in the holes 24a. In this position, either one or all of the bights on the No. II key may be changed to operate the lock and the bights may be changed to correspond to the thickness of the slide 24, or to any thickness therebetween thus making this combination very flexible and making it possible to change one or all of the tumbler combinations in different degrees. In lieu of spacing the plungers as shown and providing an extra hole in the slide 24 between each plunger, the plungers may be all grouped together and the slide 24 used to change the combination as to the first or last tumblers only.

In the form of embodiment of the invention illustrated in Figs. 17, 18 and 19, the housing 31 containing the key barrel 32 is provided with a plurality of extra plungers 33, in the embodiment shown, there being two more plungers than there are tumblers 34 in the key barrel. The key barrel 32 is separate from the flush plate 32a and is slidably mounted in the housing 31 being connected to the flush plate 32a and the unlocking cam 35 by means of a pair of rods 36 passing through openings 32b in the key barrel 32 and connected at one end to the flush plate 32a and at the other end to the unlocking cam 35. A set screw 37 projects through the wall of the housing 31 and extends into one of three groves 32c to hold the key barrel 32 in one of three positions. In the position shown in Fig. 17, the key barrel is in the No. I or A position, in which position the tumblers 34 in the key barrel are in line with the first five plungers 33 in the housing 31 and the No. I key is adapted to bring the tops of the tumblers flush with the parting line of the housing 31 in the key barrel 32 to permit unlocking of the lock. To move the key barrel from the position shown in Fig. 17 for the purpose of changing the combination, the set screw 37 is moved outwardly to permit the key barrel 32 to be shifted bodily rearward, and the No. II key, which is similar to the No. I key, but is provided with a longer shank, is inserted in the key barrel 32 and as the end of the No. II key contacts with the rod 38 at the end of the key slot, the barrel 32 is moved rearwardly until the abutments 39 on the No. II key come into contact with the flush plate 32a, in which position the barrel 32 will be located for operation by the No. II key and can no longer be operated by the No. I key because the No. I key will be too short to reach the tumblers in their proper order. To hold the lock mechanism in the No. II or B position, the screw 37 is again moved inward so that the end thereof will project into the middle groove 32c.

In case a third change of position is desired, the same procedure is used with the No. III key, shifting the barrel 32 rearwardly to the third position, bringing the plungers 34 in a line with the last five tumblers 33 in the housing 31 and fastening the lock mechanism in this position by means of the screw 37. The barrel 32 is projected forwardly and rearwardly of the tumblers 34 a sufficient distance to prevent the plungers 33 from being forced downwardly into the opening of the key barrel which would interfere with the operation of the lock.

It is to be noted that in the form of embodiment illustrated in Fig. 17, it is possible to restore the lock to the A position from the C position so that a repetition of the cycle may be had, and inasmuch as the necessity for changing the lock combination occurs, usually at intervals of not less than one year, the combination may, in most cases, be safely restored to A position after a lapse of three years' time, with reasonable assurance that the No. I key, which was lost or misplaced three or more years ago, will not be used to attempt to gain entrance into this lock particularly if an attempt has been made in the meantime and it has been discovered that the lock combination has been changed.

Figures 18a and 18b show a modification of the embodiment of the invention illustrated in Figure 17 in which the changing of a lock combination is effected by the mere insertion of the No. II key. In this embodiment of the invention, the key barrel 32 is slidably mounted in the housing 31 and is provided with a plug 38 to limit the extent of the key into the key barrel and a spring pressed plunger 37a extends through the wall of the housing 31 into grooves 32c in the key barrel to normally prevent shifting of the barrel 32. When it is desired to change the lock combination from the No. I to the No. II key, a special No. II key, having an extension 25a thereon, is inserted in the lock and the extension 25a pushes the spring pressed plunger 37b which is mounted in the key barrel against the end of the plunger 37a to bring the parting line between the plungers 37a and 37b flush with the parting line between the key barrel 32 and the housing 31, while at the same time the bights of the No. II key bring the parting line of the tumblers 34 and plunger 33 to the parting line of the key barrel and the housing, so that by pushing the No. II key further inwardly, the key barrel 32 is shifted to the rear of the housing 31 until the plunger 37a comes opposite the grooves 32c and snaps therein locating the cylinder 32 in position to be operated by the No. II key and preventing operation of the lock by the No. I key. By the use of this embodiment the only act necessary on behalf of the householder or owner of the lock, in order to change the combination to permit operation by the No. II key and prevent operation by the No. I key, is the insertion of the special No. II key in the lock and pushing the same into position.

In the form of embodiment of the invention illustrated in Figs. 20 to 24, inclusive, the housing 41 is provided with the usual key barrel 42. The key barrel is of smaller diameter than the opening in the housing and a combination cylinder 43 is inserted between the housing 41 and the barrel 42 to permit the changing of the lock combination, in this case without removal of the key barrel from the housing or disassembly of the lock. As shown in the development view of Fig. 22, the cylinder 43 is provided with a plurality of rows of holes 43a, 43b and 43c, etc., each row having holes corresponding to the number of plungers 44 and tumblers 45 in the key barrel and housing. In the A position of the lock with the holes 43a in the cylinder 43 in line with the plungers 44 and tumblers 45, a cylindrical disc 45a of the diameter of the holes 43a and the thickness of the wall of the cylinder 43 is provided in each hole so that, on insertion of the No. I key in the barrel 42, the parting line between the top of the discs 45a and the plungers 44 is brought flush with the line of separation between the cylinder 43 and the housing 41 to permit operation of the lock. In order, however, to shift the lock mechanism to a new combination, the No. I key is inserted in the lock and the pinion 46, meshing with the internal gear 43d at the front of the cylinder, is operated by means of a wrench fitting over the triangular head of the shaft 46a to move the cylinder in a clockwise direction around the barrel 42, while, at the same time, the cylinder is shifted rearwardly of the barrel by engagement of the pin 42a with the diagonal slot 43e, bringing the second row of holes 43b in a line with the plungers 44 and the tumblers 45. As soon as the row of the holes 43b arrives in this position, some of the plungers 44 will be projected downwardly into some of the holes 43b to hold the cylinder in this No. II position. Inasmuch as some of the holes 43b are not provided with discs 45a therein, in order to operate the lock, a key having a bight which elevates the tumblers 45 to the parting line of the cylinder 43 and housing 41 will now be necessary. In the particular form of embodiment shown, a key having a higher bight in the first and third tumbler will be necessary to operate the combination although it will, of course, be obvious that any one or all of the holes 43b may be left open necessitating a change in one or all of the bights in the No. II key. In order to permit changing of the lock mechanism from the B position to the C position, it is desirable to make the plungers 44 in a plurality of sections 45b, 45c, etc., each portion having a length equal to the thickness of the walls of the cylinder 43 so that in the B position, as illustrated in Fig. 23, when the first and third tumblers 45 have been moved upwardly by the No. II key, the discs 45b of the first and third tumblers will be moved into the openings 43b in the cylinder 43 and on shifting of the lock mechanism to the C position by rotation of the pinion 46 and consequent rotational and longitudinal movement of the cylinder 43, the discs 45 will be carried around by the cylinder 43, and when the row of holes 43c comes beneath the plungers 44, one or more of these plungers will be projected downwardly into the vacant holes in the row 43c to retain the cylinder in its C position making necessary a different No. III key for operating the combination dependent upon the arrangement of the discs 45a in the holes 43c. When the lock is being unlocked, the cylinder 43 turns with the key barrel 42, the two being fixed together by the engagement of the teeth of the pinion 46 with the gear teeth 43d on the cylinder 43.

In the form of embodiment shown, the third and fifth holes are open in the C position and the No. III key therefore elevates the third and fifth plungers 44 a sufficient distance higher than the bights of the No. II key to make up for the thickness of the cylinder 43. By increasing the number of rows of holes 43a, 43b, 43c, etc., the number of various combinations may be indefinitely increased, and it is also possible to vary any one or all of the bights in any key in the system and by varying the thickness of the discs 45 in the holes in the wall of the cylinder 43, variations of different amounts may be made.

Figure 25 shows a special form of key 25b provided with the usual zig-zag portion 25c in which the bights are located for operating the pin tumblers and provided also with the special socket wrench 25b having a suitable opening 25e therein for operating the retaining members 9 or the cam 20 shown in Figures 2 to 12, inclusive.

It will be understood while several forms of embodiment of the invention have been illustrated, this application is to be considered merely as illustrative of the principle of the invention and some of the forms of the embodiment which the invention may take, but that it is not restricted to the illustrative forms of embodiment shown, as many other forms of embodiment may be resorted to within the spirit of the invention and the scope of the appended claims.

What we claim is:

1. In a pin tumbler lock of the type described, a housing, a key barrel in said housing, cooperating pins and tumblers arranged in a single row on one side only of said key barrel to permit locking and unlocking of said lock, and means to change the effective height of said pins and tumblers without removing said barrel from said housing to change the lock combination.

2. In a single shear pin tumbler lock of the type described, a housing, a key barrel in said housing, locking plungers in said housing and unlocking tumblers in said key barrel, said plungers and tumblers being arranged in a single row on one side only of said key barrel and means to change the lock combination by varying the relation of said plungers and tumblers to permit operation of the lock by a new set of keys and prevent operation by a former set of keys.

3. In a pin tumbler lock, a housing, a key barrel, said key barrel adapted to receive a plurality of sets of keys, pins in said housing and tumblers in said barrel arranged in a single row on one side only of said key barrel, and means to change the effective height of the pins and tumblers, without dismantling the lock, to fit the different combination to the different sets of keys.

4. In a single shear pin tumbler lock of the type described, a housing, a key barrel adapted to receive a plurality of sets of keys, a single row of tumblers in said key barrel, a single row of plungers in said housing and on one side only of said key barrel and means to change the lock combination, without dismantling the lock, to fit the different combination to the different sets of keys.

5. In a single shear pin tumbler lock of the type described, a housing, a key barrel in said housing, locking plungers in said housing, and unlocking tumblers in said key barrel, the tumblers and plungers being in one row and on one side only of said key barrel and means to vary the effective length of said tumblers to fit the lock to different predesigned keys without removing the key barrel from said housing.

6. In a pin tumbler lock of the type described, a housing, a key barrel in said housing, locking plungers in said housing, unlocking tumblers in said key barrel, the tumblers and plungers being in one row, and slide means to change the effective length of said tumblers to adapt the lock for operation by different predesigned keys.

7. In a pin tumbler lock of the type described, a housing, a key barrel in said housing, locking plungers in said housing and unlocking tumblers in said key barrel, a slide in said key barrel having openings in line with said tumblers, and discs in said openings, and means to rotate said slide relative to said tumblers to bring various openings in line with said tumblers to vary the effective length thereof.

8. In a pin tumbler lock of the type described, a housing, a key barrel in said housing, a cylinder between said key barrel and said housing, locking plungers in said housing and unlocking tumblers in said key barrel, and rows of holes in said cylinder adapted to be moved into line with said plungers and tumblers, and means to move the cylinder relative to the key barrel to change the lock combination.

9. In a pin tumbler lock of the type described, a housing, a key barrel in said housing, a cylinder between said key barrel and said housing, locking plungers in said housing and unlocking tumblers in said key barrel, and rows of holes in said cylinder adapted to be moved into line with said plungers and tumblers, discs in some of said holes, and means to move the cylinder relative to the key barrel to change the lock combination.

10. In a pin tumbler lock of the type described, a housing, a key barrel in said housing, a cylinder between said key barrel and said housing, locking plungers in said housing and unlocking tumblers in said key barrel, and rows of holes in said cylinder adapted to be moved into line with said plungers and tumblers, discs in some of said holes, said discs forming part of said tumblers, and means to move the cylinder relative to the key barrel to change the lock combination without removing the key barrel from said housing.

11. In a pin tumbler lock of the type described, a housing, a key barrel in said housing, locking plungers in said housing and unlocking tumblers in said key barrel and a concentric change cylinder means to rotate the change cylinder relative to said housing to permit operation of the lock by a new set of keys and prevent operation by a previous set of keys.

12. In a pin tumbler lock of the type described, a housing, a key barrel in said housing, movable plungers carried by the housing in a single row on one side only of said key barrel to hold the key barrel against movement except on insertion of a predesigned key, and means for varying the tumbler shear line of the plungers whereby when the shear line of said plungers is varied a different key is required to release the lock.

13. In a single shear pin tumbler lock of the class described, a housing, a key barrel mounted in said housing, a change cylinder concentric to said key barrel and adapted to be moved relative thereto, said key barrel, change cylinder and housing having a series of coincident apertures, pin tumblers in said apertures, variable sized plungers cooperating therewith and means to vary the height and number of said varied plungers by relative rotation of said change cylinders with respect to said key barrel and means projecting from the face of said key barrel to cause said rotation whereby different keys may be used in the alternative to operate said lock.

14. A pin tumbler lock of the single shear type having a plurality of pins and tumblers of a predetermined size and an intermediate change barrel rotatable relative to the key barrel to increase or decrease the effective height of said tumblers.

15. In a pin tumbler lock, a housing, a key barrel in said housing, a single row of locking plungers in said housing on one side of said key barrel, a single row of unlocking tumblers in said key barrel, and releasable means to retain some of said plungers in inoperative position.

16. In a pin tumbler lock, a housing, a key barrel in said housing, a single row of locking plungers in said housing on one side of said key barrel, a single row of unlocking tumblers in said key barrel, releasable means to retain some of said plungers in inoperative position, and means extending outside said lock for releasing said retaining means.

17. In a pin tumbler lock of the type described, a housing, a key barrel in said housing, locking plungers in said housing and unlocking tumblers in said key barrel, the tumblers and plungers being in one row and on one side of said key barrel, and means for retaining some of said plungers in inoperative position, comprising retaining pins, and a cam shaft for positioning said retaining pins, said cam shaft extending to the front of the lock and being operable therefrom.

18. In a pin tumbler lock of the type described, a housing, a key barrel in said housing, locking plungers in said housing and unlocking tumblers in said key barrel, said plungers and tumblers being arranged in a single row on one side of said key barrel, the plungers in said housing exceeding in number the plungers in said key barrel and means to permit shifting of the key barrel longitudinally relative to said housing by the insertion of a longer key therein.

19. In a pin tumbler lock of the type described, a housing, a key barrel in said housing, a single row of cooperating movable plungers and tumblers carried in said key barrel and housing on one side only of the key slot forming a shear line between said housing and key barrel to permit rotation of the key barrel in the housing on insertion of a predesigned key, and means for varying the tumbler shear line of said plungers and tumblers while maintaining the key barrel stationary whereby when the tumbler shear line of said plungers and tumblers is varied, a different key is required to release said lock.

20. In a pin tumbler lock of the type described, a housing, a key barrel in said housing, cooperating movable plungers and tumblers carried in said key barrel and housing in a single line and on one side only of said key barrel, and forming a shear line between said housing and key barrel to permit rotation of the key barrel in the housing on insertion of a predesigned key and means for varying the tumbler shear line of said cooperating plungers and tumblers whereby when the shear line of said plungers is varied, a different key is required to release said lock.

In testimony whereof we have affixed our signatures to this specification.

NELSON LITTELL.
WILLIAM P. HAMMOND.